(12) United States Patent
Nakano et al.

(10) Patent No.: US 12,716,517 B2
(45) Date of Patent: Aug. 25, 2026

(54) SOLENOID, SOLENOID VALVE, AND SUSPENSION DEVICE

(71) Applicant: Hitachi Astemo, Ltd., Hitachinaka (JP)

(72) Inventors: Gota Nakano, Hitachinaka (JP); Chikara Yanagisawa, Hitachinaka (JP)

(73) Assignee: Hitachi Astemo, Ltd., Hitachinaka-shi (JP)

( * ) Notice: Subject to any disclaimer, the term of this patent is extended or adjusted under 35 U.S.C. 154(b) by 35 days.

(21) Appl. No.: 18/610,986

(22) Filed: Mar. 20, 2024

(65) Prior Publication Data

US 2024/0229963 A1 Jul. 11, 2024

Related U.S. Application Data

(63) Continuation of application No. PCT/JP2023/017028, filed on May 1, 2023.

(30) Foreign Application Priority Data

May 10, 2022 (JP) ................................ 2022-077805

(51) Int. Cl.
*F16K 27/04* (2006.01)
*B60G 17/08* (2006.01)
(Continued)

(52) U.S. Cl.
CPC .......... *F16K 31/0675* (2013.01); *B60G 17/08* (2013.01); *F16J 15/3464* (2013.01);
(Continued)

(58) Field of Classification Search
USPC ................ 277/370, 382, 403, 641, 614, 625
See application file for complete search history.

(56) References Cited

U.S. PATENT DOCUMENTS 2,291,709 A * 8/1942 Goetze .................... F16L 23/20 285/368
2,330,425 A * 9/1943 Hilton .................... F16J 15/121 277/649

(Continued)

FOREIGN PATENT DOCUMENTS

JP 2014199076 A 10/2014
JP 6852051 B2 3/2021
WO 2015020227 A1 2/2015

OTHER PUBLICATIONS

International Search Report mailed Jul. 25, 2023 for the corresponding International Patent Application No. PCT/JP2023/017028 (2 pages).

*Primary Examiner* — Matthew W Jellett
(74) *Attorney, Agent, or Firm* — Leason Ellis LLP; Edward J. Ellis; Melvin C. Garner

(57) ABSTRACT

A solenoid includes: a solenoid unit including a coil and an inner protruding portion covering a periphery of the coil by molded resin; a housing into which the inner protruding portion is inserted; and a sealing element configured to seal a gap between the solenoid unit and the housing. The solenoid unit includes an inclined surface extending in a direction that intersects a direction of insertion of the inner protruding portion into the housing. The housing includes an inclined surface extending in a direction that intersects the direction of insertion. The sealing element is configured to seal the gap by coming into contact with the inclined surface of the solenoid unit and the inclined surface of the housing.

12 Claims, 10 Drawing Sheets

(51) Int. Cl.
*F16J 15/34* (2006.01)
*F16K 1/46* (2006.01)
*F16K 27/02* (2006.01)
*F16K 31/06* (2006.01)
*B60G 17/06* (2006.01)

(52) U.S. Cl.
CPC .............. *F16K 1/46* (2013.01); *F16K 27/029* (2013.01); *F16K 27/048* (2013.01); *B60G 17/06* (2013.01); *B60G 2600/26* (2013.01)

(56) References Cited

U.S. PATENT DOCUMENTS

| | | | | |
|---|---|---|---|---|
| 3,255,916 | A * | 6/1966 | Rice | F16J 15/062 220/304 |
| 5,427,351 | A * | 6/1995 | Korfgen | F16K 21/10 251/35 |
| 12,339,137 | B2 * | 6/2025 | Hilbert | F16J 15/062 |
| 2007/0241512 | A1 * | 10/2007 | Tsuboi | F16J 15/344 277/382 |
| 2014/0291088 | A1 | 10/2014 | Katayama et al. | |
| 2015/0021863 | A1 * | 1/2015 | Wang | F16L 23/20 277/614 |
| 2016/0195152 | A1 * | 7/2016 | Mori | F16F 9/465 188/313 |
| 2019/0072202 | A1 | 3/2019 | Uemura | |
| 2020/0408319 | A1 * | 12/2020 | Chen | F16K 27/048 |

* cited by examiner

SOLENOID, SOLENOID VALVE, AND SUSPENSION DEVICE

CROSS REFERENCE TO RELATED APPLICATIONS

This application is a Continuation of International Patent Application No. PCT/JP2023/017028 filed on May 1, 2023, which claims the benefit of priority to Japanese Patent Application No. 2022-077805 filed on May 10, 2022, the contents of all of which are incorporated herein by reference in their entireties

FILED OF THE INVENTION

The present invention relates to a solenoid, a solenoid valve, and a suspension device.

BACKGROUND OF THE INVENTION

For example, a solenoid disclosed in Japanese Patent No. 6852051 includes: a housing having a top opening and configured to receive, through the top opening, a solenoid body with a coil wound around a bobbin; a primary package made of molded resin that covers the solenoid body, the primary package being configured to be mounted on the top opening of the housing to form a gap between the primary package and the top opening; and a secondary package made of molded resin that covers the primary package to close the gap.

For example, Japanese Patent Application Laid-Open Publication No. 2014-199076 discloses the use of a solenoid as a component for generating a damping force for shock absorbers installed in vehicles.

CITATION LIST

Patent Literature

Patent Literature 1: Japanese Patent No. 6852051
Patent Literature 2: Japanese Patent Application Laid-Open Publication No. 2014-199076

Technical Problem

There is room for further improvements to the solenoid disclosed in Japanese Patent No. 6852051 in terms of preventing muddy water from entering the housing and oil from leaking from the housing.

It is an object of the present invention to provide a solenoid that provides improved reliability of a sealing structure within the housing.

SUMMARY OF THE INVENTION

Solution to Problem

With the above object in view, an aspect of the present invention relates to a solenoid. The solenoid includes: a solenoid body including a coil and a peripheral portion covering a periphery of the coil by molded resin; a housing into which the peripheral portion is inserted; and a sealing element configured to seal a gap between the solenoid body and the housing. The solenoid body includes a first intersecting surface extending in a direction that intersects a direction of insertion of the peripheral portion into the housing. The housing includes a second intersecting surface extending in a direction that intersects the direction of insertion. The sealing element is configured to seal the gap by coming into contact with the first intersecting surface and the second intersecting surface, and one of the first intersecting surface and the second intersecting surface is inclined relative to the direction of insertion.

Advantageous Effects of Invention

The present invention can provide a solenoid that provides improved reliability of a sealing structure within the housing.

DETAILED DESCRIPTION OF THE INVENTION

Exemplary embodiments of the present invention will be detailed below with reference to the appended drawings.

First Embodiment

Figure 1:
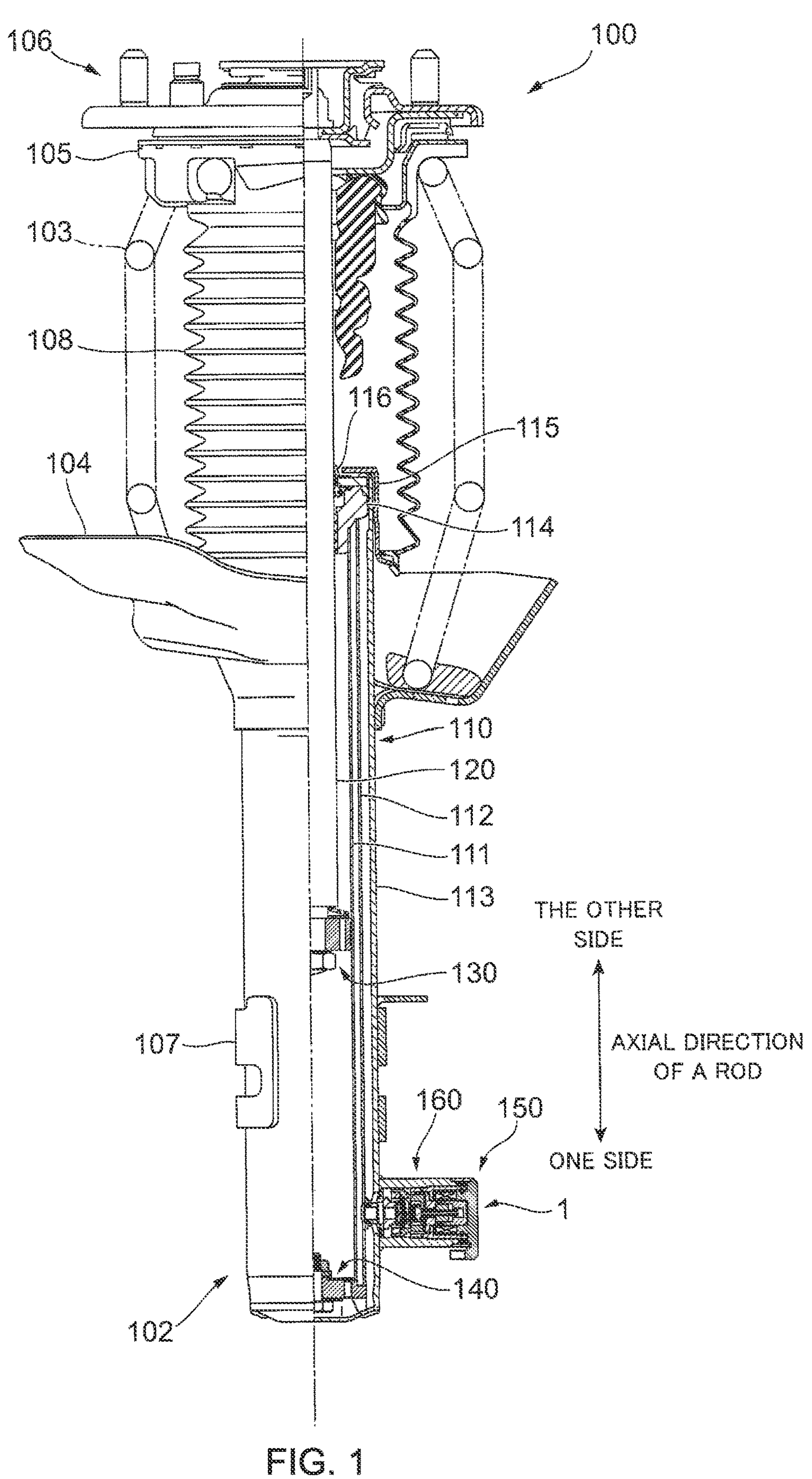
FIG. 1 illustrates an example schematic configuration of a suspension device according to a first embodiment.

FIG. 1 illustrates an example schematic configuration of a suspension device 100 according to a first embodiment.

The suspension device 100 is a suspension strut and, as shown in FIG. 1, includes a hydraulic shock absorber 102 and a coil spring 103 disposed outside the hydraulic shock absorber 102. The suspension device 100 further includes a lower spring seat 104 and an upper spring seat 105, where the lower spring seat 104 supports one end (lower end in FIG. 1) of the coil spring 103 in the axial direction of a rod 120 (described below), and the upper spring seat 105 supports the other end (upper end in FIG. 1) of the coil spring 103 in the axial direction of the rod 120.

The suspension device 100 further includes a vehicle body-side bracket 106 and a wheel-side bracket 107, where the vehicle body-side bracket 106 is attached to the other axial end of the rod 120 for attaching the suspension device 100 to the vehicle, and the wheel-side bracket 107 is secured to one end of a cylinder unit 110 (described below) in the axial direction of the rod 120 for attaching the suspension device 100 to a wheel. The suspension device 100 further includes a dust cover 108 to cover at least portions of the cylinder unit 110 and the rod 120. The vehicle body-side bracket 106 is attached to the other axial end of the rod 120.

The hydraulic shock absorber 102 includes the cylinder unit 110 to contain oil as an example of a working fluid, and the rod 120 having one end protruding from the cylinder unit 110 and the other end slidably inserted into the cylinder unit 110. The hydraulic shock absorber 102 further includes a piston unit 130 provided at one end of the rod 120, and a bottom unit 140 provided at one end of the cylinder unit 110. The hydraulic shock absorber 102 further includes an outer damping unit 150 provided outside of the cylinder unit 110 to generate damping force.

The cylinder unit 110 includes a cylinder 111 to contain oil, an outer cylindrical body 112 provided outside of the cylinder 111, and a damper case 113 provided outside of the outer cylindrical body 112. The cylinder unit 110 further includes a rod guide unit 114 to support the rod 120 such that the rod 120 is movable, a bump stopper cap 115 attached to one end of the damper case 113, and an oil seal 116 to prevent oil from leaking from the damper case 113 and foreign matters from entering the damper case 113.

Outer Damping Unit 150

Figure 2:
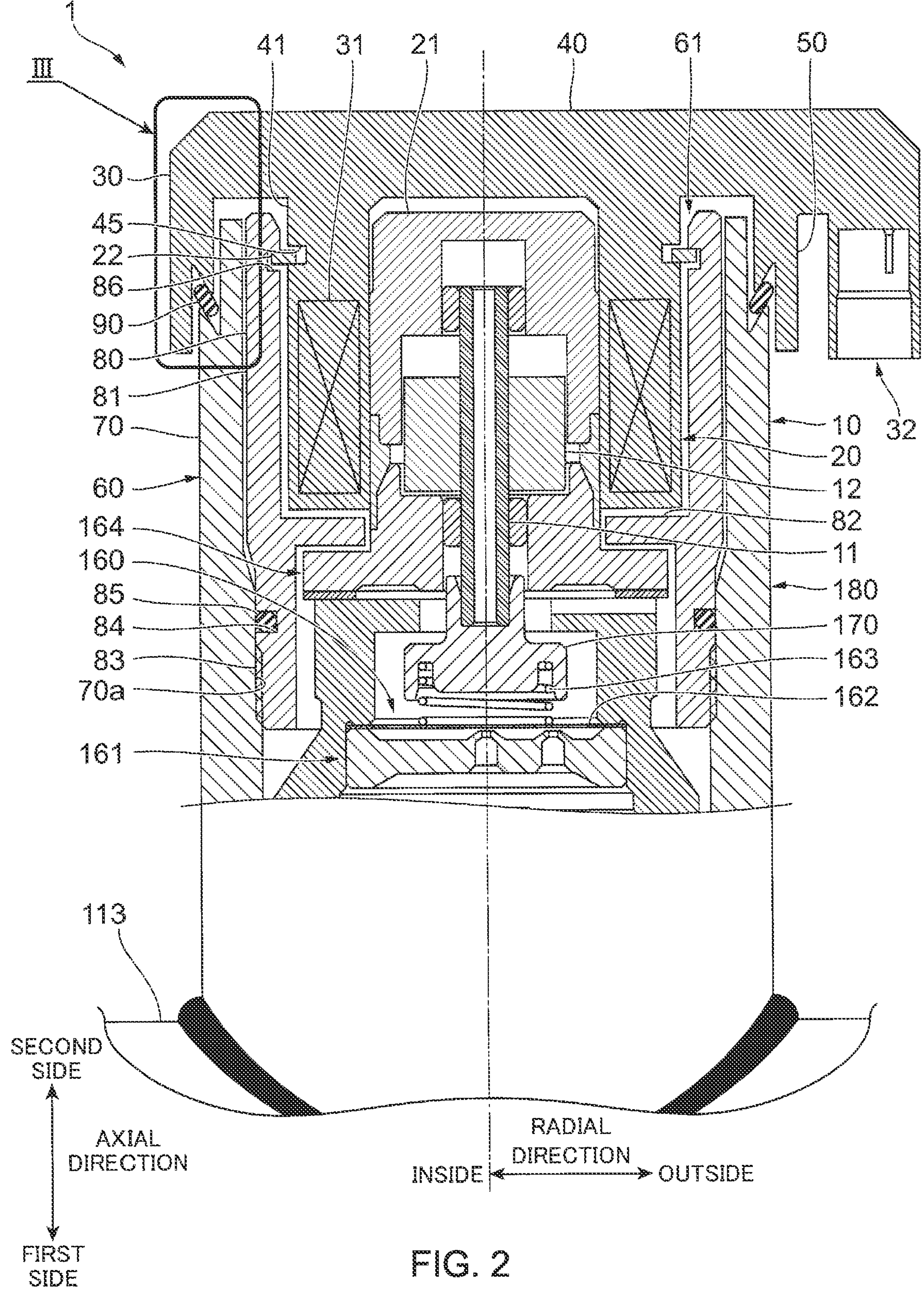
FIG. 2 illustrates an example schematic configuration of a solenoid according to the first embodiment.

FIG. 2 illustrates an example schematic configuration of a solenoid 1 according to the first embodiment.

Figure 3:
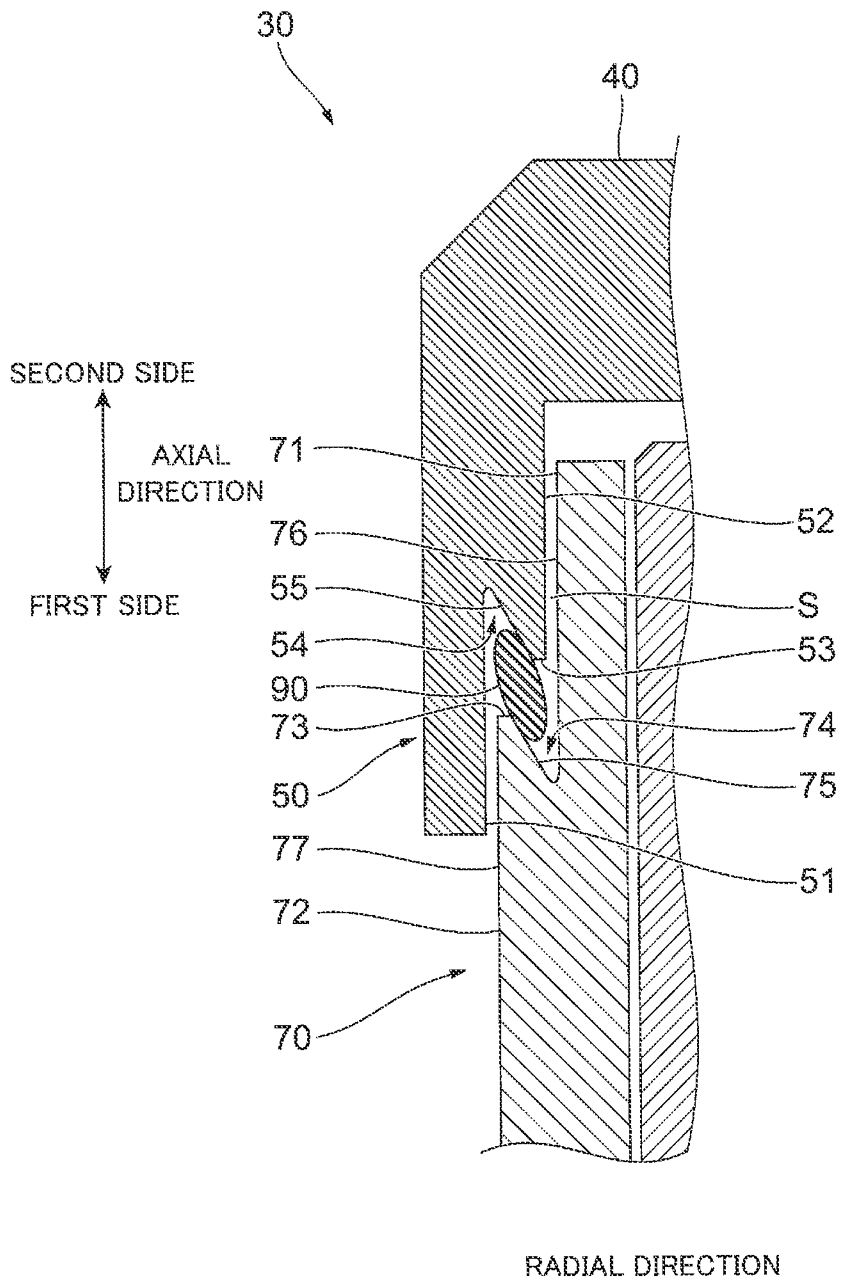
FIG. 3 illustrates an example cross-section of part III-III in FIG. 2.

FIG. 3 illustrates an example cross-section of part III-III in FIG. 2.

The outer damping unit 150 includes a damping force mechanism unit 160 to generate damping force and a solenoid 1 to adjust the damping force of the damping force mechanism unit 160.

The damping force mechanism unit 160 includes an orifice plate 161 formed with channels and a pilot valve 162 to open and close the channels of the orifice plate 161. The damping force mechanism unit 160 further includes a compression coil spring 163 to apply a force to the pilot valve 162 in the direction that causes the pilot valve 162 to close the channels of the orifice plate 161, and a support member 164 to slidably support a plunger 11 (described below). The damping force mechanism unit 160 is not limited to a particular configuration and may be of any configuration. Hence, FIG. 2 omits illustration of other components of the damping force mechanism unit 160.

The solenoid 1 is now detailed below.

The solenoid 1 includes a valve unit 10 to open and close the channels, a solenoid unit 20 to drive the plunger 11 (described below) of the valve unit 10, a housing 60 to contain the valve unit 10 as well as a coil 31 (described below) and other components of the solenoid unit 20, and a circular elastic sealing element 90 to seal a gap between the solenoid unit 20 and the housing 60.

The axial direction of the plunger 11 may be referred to hereinafter as the "axial direction." The axial direction also corresponds to the centerline of the cylindrical housing 60. In the axial direction, the lower and upper sides in FIG. 2 may be referred to as the "first side" and "second side," respectively. The direction intersecting the axial direction (e.g., perpendicular direction) is referred to as the "radial direction." In the radial direction, the side closer to the centerline of the housing 60 may be referred to as the "inside," and the side away from the centerline may be referred to as the "outside."

Valve Unit 10

The valve unit 10 includes the plunger 11 that holds an adjustment valve 170 to control the flow of oil in the orifice plate 161 formed with the channels, and a magnetic element 12, such as a magnet, secured to the plunger 11.

The adjustment valve 170 is disposed at a position opposite the pilot valve 162 in the axial direction. The adjustment valve 170 is movable in the axial direction and is capable of contacting the pilot valve 162 by moving toward the first side. As such, the adjustment valve 170 can be in any state between being in contact with the pilot valve 162 and being farthest away from the pilot valve 162. This allows the adjustment valve 170 to adjust the flow rate of oil flowing through the channels in the orifice plate 161. Hence, the adjustment valve 170 functions as an example of the valve configured to have its position adjusted by the solenoid 1 to adjust the force with which the oil opens and closes the channels. The adjustment valve 170 and the solenoid 1 constitute a solenoid valve 180.

The plunger 11 is a rod-like member formed along the axial direction. The plunger 11 holds the adjustment valve 170 at the first side and holds the magnetic element 12 at the center in the axial direction. The plunger 11 is supported by a fixed core 21 and the support member 164 (described below) such that the plunger 11 is movable in the axial direction via bearings. When the solenoid unit 20 is energized, the plunger 11 is pushed by the solenoid unit 20 toward the first side together with the adjustment valve 170. On the other hand, when the solenoid unit 20 is de-energized, the plunger 11 is pushed by the compression coil spring 163 back toward the second side together with the adjustment valve 170.

Housing 60

The housing 60 includes a generally cylindrical outer housing 70 located on the outside and an inner housing 80 located on the inside relative to the outer housing 70. By way of example, the outer housing 70 and the inner housing 80 may be molded from metal. By way of alternative example, the outer housing 70 may be molded from metal and the inner housing 80 may be molded from resin.

The outer housing 70 is secured at its portion on the first side to the outer circumference surface of the damper case 113 of the cylinder unit 110 by e.g., welding or the like. The outer housing 70 is formed with a female thread 70*a* on its inner circumferential surface.

As shown in FIG. 3, the outer housing 70 includes a first cylindrical portion 71 provided at a second side end and a second cylindrical portion 72 provided on the first side relative to the first cylindrical portion 71. The first cylindrical portion 71 and the second cylindrical portion 72 have the same inner diameter, and the first cylindrical portion 71 has a smaller outer diameter than that of the second cylindrical portion 72. The second cylindrical portion 72 includes a groove 74 formed over the entire circumference at an inner portion of its second side end and depressed from a second side end face 73 toward to the first side. The groove 74 includes, in its outer portion, an inclined surface 75 that is inclined relative to the axial direction such that the diameter gradually decreases from the second side toward the first side.

Coating is applied to an outer surface of the outer housing 70, including an outer circumferential surface 76 of the first cylindrical portion 71, an outer circumferential surface 77 of the second cylindrical portion 72, the end face 73, and the groove 74. By way of example, the coating may be a cationic electrodeposition coating with high corrosion resistance.

It should be noted that the cross-section of the groove 74 taken in a plane parallel to the axial direction may be semicircular.

The inner housing 80 includes a cylindrical portion 81 of a generally cylindrical shape and an annular portion 82 of an annular shape protruding inward from the inner circumferential surface of the cylindrical portion 81.

The cylindrical portion 81 includes a male thread 83 formed on its first side end, which is tightened to the female thread 70*a* formed on the inner circumference surface of the outer housing 70. In addition, the cylindrical portion 81 includes a recess 84 formed in its portion on the second side relative to the male thread 83 and depressed from the outer circumferential surface. An O-ring 85 to seal a space between the outer circumferential surface of the inner housing 80 and the inner circumferential surface of the outer housing 70 is held in the recess 84.

The cylindrical portion 81 further includes a first engaging portion 86 formed on its second side end over the entire circumference and depressed from the inner circumferential surface.

Solenoid Unit 20

The solenoid unit 20 includes a cover unit 30 to cover an opening 61 of the housing 60, the fixed core 21, and a clip 22 to position the cover unit 30 relative to the housing 60 in the axial direction. When energized, the solenoid unit 20 pushes the plunger 11 toward the first side.

The clip 22 is a metal member having a rectangular cross-section when taken in a plane parallel to the axial direction, with the axial direction corresponding to the transverse direction and the radial direction corresponding to the longitudinal direction, and having a C-shaped cross-section when taken in a plane perpendicular to the axial direction.

The cover unit 30 includes the coil 31, a covering portion 40 to hold the coil 31 and cover the opening 61 of the housing 60, and a connector portion 32 for energizing the coil 31. The cover unit 30 is molded by insert molding, in which the metal coil 31 and other parts are held in a mold, followed by filling resin heated to a softening temperature of the resin into the mold over the portions corresponding to the covering portion 40 and the connector portion 32.

The covering portion 40 includes a generally cylindrical inner protruding portion 41 and a generally cylindrical outer protruding portion 50, where the inner protruding portion 41 protrudes toward the first side from a disk-shaped portion of the covering portion 40 covering the opening 61 of the housing 60 and is to be inserted into the housing 60, and the outer protruding portion 50 protrudes toward the first side at a position outside of the inner protruding portion 41. These inner protruding portion 41 and outer protruding portion 50 are molded from mold resin.

The inner protruding portion 41 is located outside of the fixed core 21 and inside of the housing 60, and includes the coil 31 at a position that overlaps, in the axial direction, the moving range of the magnetic element 12 secured to the plunger 11.

In addition, the inner protruding portion 41 includes a second engaging portion 45 depressed from the outer circumferential surface and formed around the entire circumference in a portion on the second side relative to the center in the axial direction. The second engaging portion 45 is formed at a position in the axial direction that corresponds to the first engaging portion 86 formed in the cylindrical portion 81 of the inner housing 80. The clip 22 is fitted into the second engaging portion 45 and the first engaging portion 86.

The outer protruding portion 50 is located outside of the second side end of the outer housing 70 and covers the periphery of the second side end of the outer housing 70. The gap between the outer protruding portion 50 and the outer housing 70 is sealed by the sealing element 90.

The outer protruding portion 50 includes a first cylindrical portion 51 provided at the first side end and a second cylindrical portion 52 provided at the second side end. The first cylindrical portion 51 and the second cylindrical portion 52 have the same outer diameter, and the first cylindrical portion 51 has a larger inner diameter than that of the second cylindrical portion 52. The second cylindrical portion 52 includes a groove 54 formed in an outer portion of its first side end and depressed from a first side end face 53 toward the second side. The groove 54 includes in its inner portion an inclined surface 55 that is inclined relative to the axial direction such that the diameter gradually decreases from the second side toward the first side.

It should be noted that the cross-section of the groove 54 taken in a plane parallel to the axial direction may be semicircular.

Before being assembled between the cover unit 30 and the outer housing 70, the sealing element 90 has an elliptical cross-section when taken in a plane parallel to the axial direction, with its major axis oriented in the axial direction. The sealing element 90 is sandwiched between the groove 54 of the outer protruding portion 50 of the cover unit 30 and the groove 74 of the outer housing 70 and is elastically deformed under the force applied by the inclined surface 55 of the outer protruding portion 50 and the inclined surface 75 of the outer housing 70, sealing the gap between the outer protruding portion 50 and the outer housing 70.

It should be noted that the sealing element 90 is not limited to having an elliptical cross-section. For example, the sealing element 90 may be an O-ring or X-ring.

As the sealing element 90 is sandwiched in an elastically deformed state between the outer housing 70 and the outer protruding portion 50 of the cover unit 30, the cover unit 30 is subjected to a force acting in the axial direction from the first side toward the second side. In the present embodiment, even if this force acts on the cover unit 30, the clip 22 fitted in the second engaging portion 45 of the cover unit 30 butts against the first engaging portion 86 of the inner housing 80, preventing the cover unit 30 from moving toward the second side.

By way of example, the above configured solenoid 1 may be assembled as follows. Specifically, an operator assembles components of the damping mechanism, including the orifice plate 161, the pilot valve 162, and the compression coil spring 163, components of the valve unit 10, including the adjustment valve 170, the plunger 11, and the magnetic element 12, as well as the support member 164, the fixed core 21, and other components into the interior of the outer housing 70 secured to the outer circumferential surface of the damper case 113. The operator then tightens the inner housing 80 to the outer housing 70. Then, with the sealing element 90 disposed in the groove 74 of the outer housing 70, the operator assembles the cover unit 30 onto the housing 60. At that time, with the clip 22 fitted in the second engaging portion 45 of the inner protruding portion 41 of the cover unit 30, the operator inserts the inner protruding portion 41 into the interior of the inner housing 80. With the clip 22 elastically deformed by contact with the inner circumferential surface of the inner housing 80 such that the clip 22 reduces in diameter to be fully embedded in the second engaging portion 45 of the inner protruding portion 41, the inner protruding portion 41 is inserted into the interior of the inner housing 80. Once the clip 22 is inserted to a position corresponding to the first engaging portion 86 formed in the inner housing 80, the clip 22 increases in diameter, causing its outside portion to fit into the first engaging portion 86. This prevents the cover unit 30 from pulling out of the housing 60 after the cover unit 30 is assembled onto the housing 60. In other words, the first side face of the clip 22 butts against the first side face of the second engaging portion 45 and the second side face of the clip 22 butts against the second side face of the first engaging portion 86, which prevents the cover unit 30 from pulling out of the housing 60 even if the cover unit 30 receives from the sealing element 90 force in the direction away from the housing 60.

The solenoid 1 described above includes the solenoid unit 20 (an example of the solenoid body) including the coil 31 and the inner protruding portion 41 (an example of the peripheral portion) that covers the periphery of the coil 31 by molded resin. The solenoid 1 further includes the housing 60 into which the inner protruding portion 41 is inserted, and the sealing element 90 to seal a gap S between the solenoid unit 20 and the housing 60. The solenoid unit 20 includes the inclined surface 55 (an example of the first intersecting surface) extending in a direction that intersects the axial direction, which is an example of the direction of insertion of the inner protruding portion 41 into the housing 60, and the housing 60 includes the inclined surface 75 (an example of a second intersecting surface) extending in a direction that intersects the axial direction. The sealing element 90 seals the gap S by coming into contact with the inclined surface 55 and the inclined surface 75.

In the above configured solenoid 1, the sealing element 90 contacts the inclined surface 55 of the cover unit 30 and the inclined surface 75 of the outer housing 70, which leads to a larger contact area between the inclined surfaces 55, 75 and the sealing element 90 as compared to a configuration where the sealing element 90 contacts, for example, surfaces parallel to the axial direction or perpendicular to the axial direction. As a result, the solenoid 1 provides improved sealing performance of the gap S between the solenoid unit 20 and the housing 60, which in turn provides improved reliability of a sealing structure within the housing 60.

In particular, the elliptical shape of the sealing element 90 of the present embodiment leads to a larger contact area with the inclined surfaces 55, 75 as compared to, for example, the use of an O-ring with a circular cross-section, improving the sealing performance.

Additionally, the inclined surfaces 55, 75 are inclined in the same direction relative to the axial direction, which facilitates sandwiching of the sealing element 90 between the inclined surfaces 55, 75 and leads to an increased contact area between the sealing element 90 and the inclined surfaces 55, 75, improving the sealing performance.

The sealing element 90 is disposed between the groove 74 depressed from the second side end face 73 of the second cylindrical portion 72 of the outer housing 70 and the groove 54 depressed from the first side end face 53 of the outer protruding portion 50 of the cover unit 30, which prevents the sealing element 90 from falling such that the major axis of the ellipse lies parallel to the radial direction. This improves sealing between the cover unit 30 and the housing 60.

In the solenoid 1, the sealing element 90 functions as a seal between the cover unit 30 and the outer housing 70 and also as a reaction force member that applies a force in a direction that causes the cover unit 30 to go away from the housing 60. In the solenoid 1, the clip 22 prevents the cover unit 30 from falling off the housing 60. Hence, the solenoid 1 can do without components necessary for securing the cover unit 30, which can lead to reduced components and thus reduced costs. In addition, the operator can easily assemble the solenoid 1. Furthermore, since the sealing element 90 is a general-purpose component, it can also be shared with components used for sealing other products.

The outer housing 70 is made of metal, and is coated on its outer circumferential surface 77 and at least a portion of the inclined surface 75 located outside of its portion to contact the sealing element 90. This prevents the outer housing 70 from rusting. Furthermore, the coating is a cationic electrodeposition coating, which provides greater corrosion resistance than, for example, when plating is applied.

Second Embodiment

Figure 4:
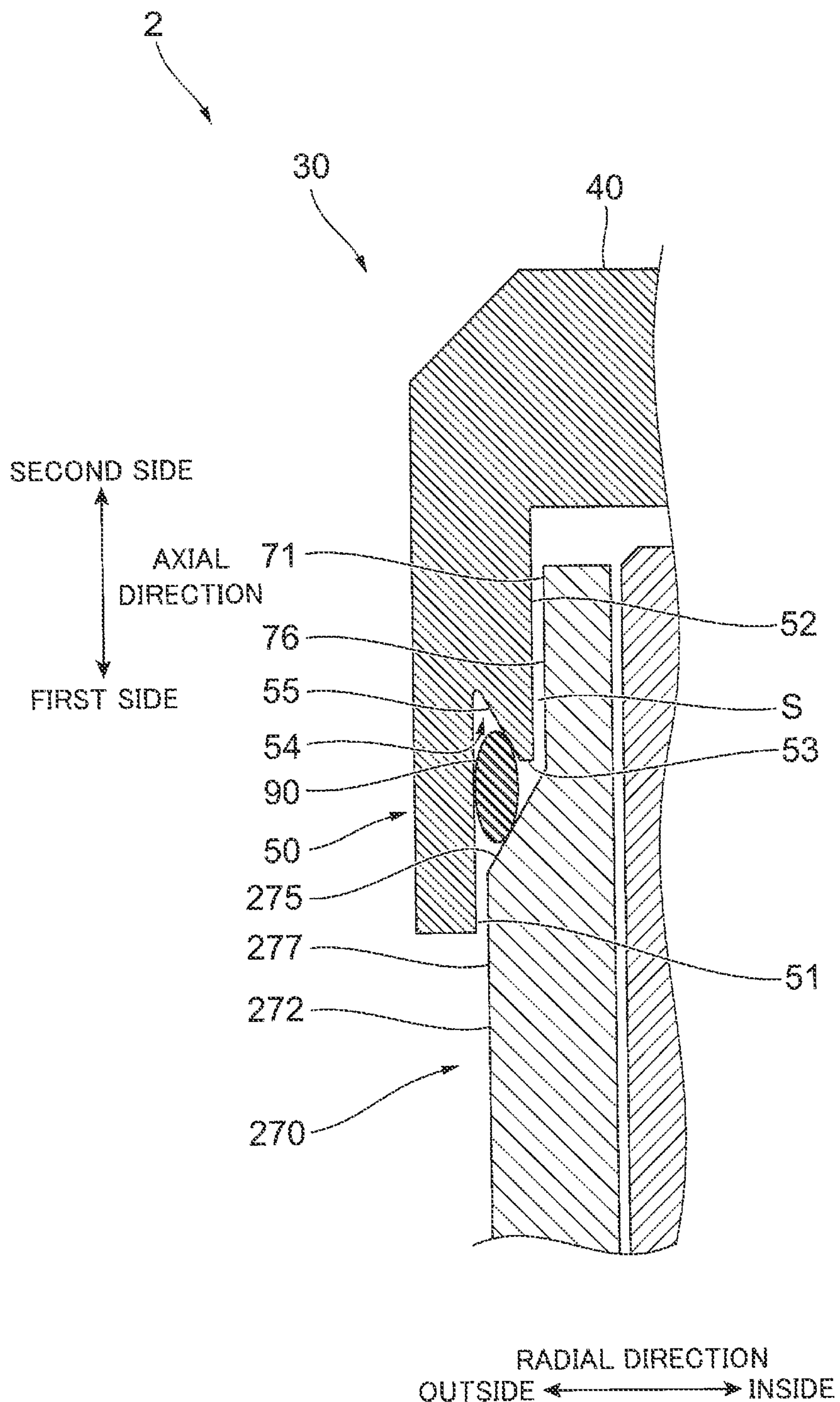
FIG. 4 illustrates an example schematic configuration of a solenoid according to a second embodiment.

FIG. 4 illustrates an example schematic configuration of a solenoid 2 according to a second embodiment.

A distinction of the solenoid 2 according to the second embodiment from the solenoid 1 according to the first embodiment relates to an outer housing 270, which corresponds to the outer housing 70. The distinction from the first embodiment is described below. The same reference numerals are used to identify the same elements in the first and second embodiments, and detailed descriptions thereof are omitted.

A distinction of the outer housing 270 from the outer housing 70 according to the first embodiment relates to a second cylindrical portion 272, which corresponds to the second cylindrical portion 72. The second cylindrical portion 272 includes, at the second side end, an inclined surface 275 that is inclined relative to the axial direction such that the diameter gradually increases from the second side toward the first side. The inclined surface 275 is inclined relative to the axial direction in a different direction than the inclined surface 75 according to the first embodiment. Hence, the inclined surface 275 and the inclined surface 55 are inclined in different directions relative to the axial direction.

In the above configured solenoid 2, the sealing element 90 contacts the inclined surface 55 of the cover unit 30 and the inclined surface 275 of the outer housing 270, which leads to a larger contact area between the inclined surfaces 55, 275 and the sealing element 90. This provides improved sealing performance of the gap S between the cover unit 30 and the outer housing 270, which in turn provides improved reliability of the sealing structure within the outer housing 270.

As with the solenoid 1, the solenoid 2 can do without components necessary for securing the cover unit 30, which can lead to reduced components and thus reduced costs. In addition, the operator can easily assemble the solenoid 2. Furthermore, since the sealing element 90 is a general-purpose component, it can be shared with components used for sealing other products. Also, the sealing element 90 is disposed in the groove 54 depressed from the first side end face 53 of the outer protruding portion 50 of the cover unit 30, which prevents the sealing element 90 from falling such that the major axis of the ellipse lies parallel to the radial direction.

In the solenoid 2, the inclined surface 275 and an outer circumferential surface 277 of the outer housing 270 form an obtuse angle. Thus, the thickness of the coating applied to the connection between the inclined surface 275 and the outer circumferential surface 277 of the outer housing 270 is less likely to be smaller than that of the coating applied to other portions such as, for example, the outer circumferential surface 76. This renders the solenoid 2 more resistant to corrosion.

Figure 5:
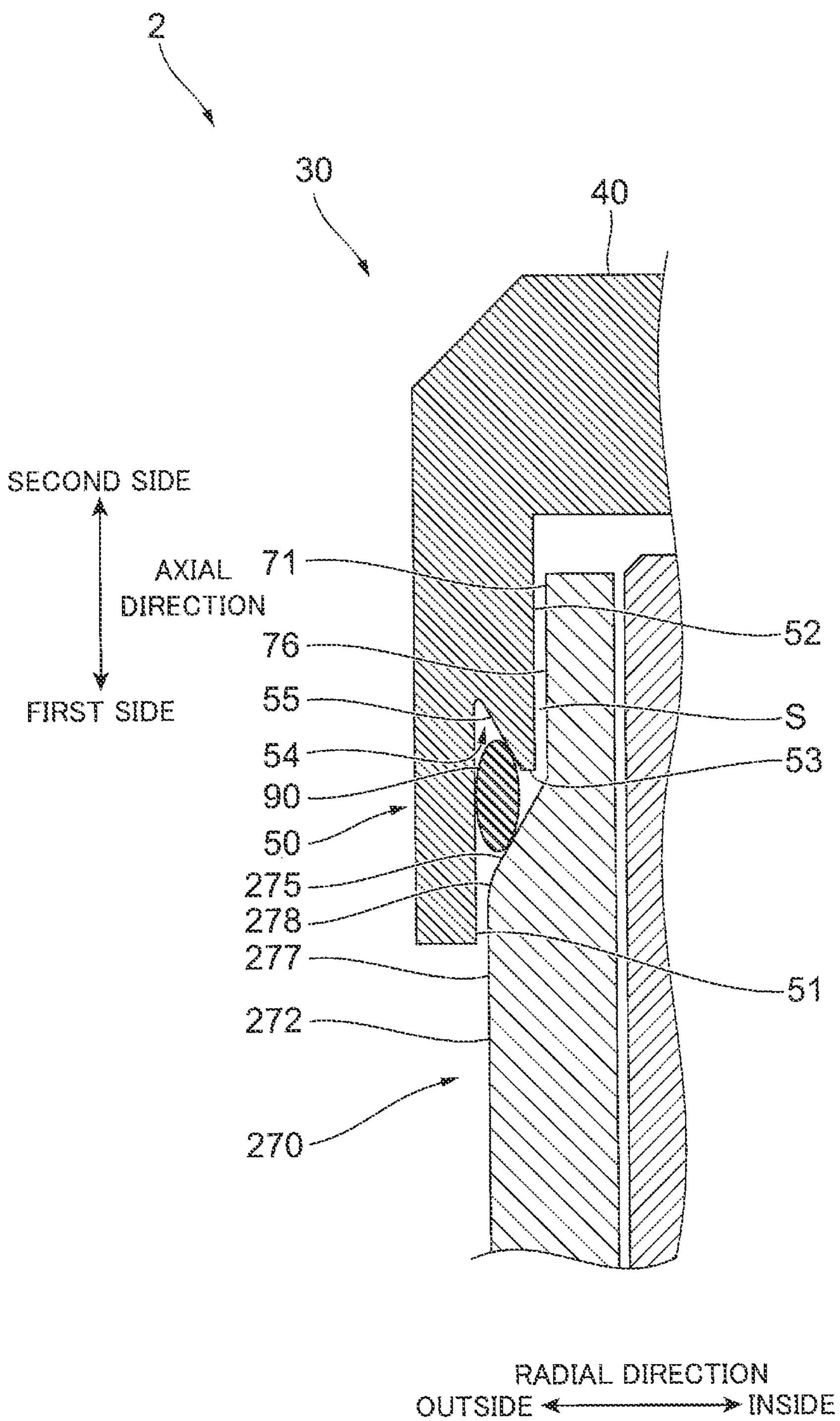
FIG. 5 illustrates an example variation of an outer housing according to the second embodiment.

FIG. 5 illustrates an example variation of the outer housing 270 according to the second embodiment.

The outer housing 270 may include, between the inclined surface 275 and the outer circumferential surface 277 of the second cylindrical portion 272, a curved surface 278 that is curved such that the diameter gradually increases from the second side toward the first side. In other words, the outer housing 270 may include the curved surface 278 connecting the inclined surface 275 and the outer circumferential surface 277. By virtue of the presence of the curved surface 278, the thickness of the coating applied to the curved surface 278, which is the connection between the inclined surface 275 and the outer circumferential surface 277 of the outer housing 270, is less likely to be smaller than that of the coating applied to other portions such as, for example, the outer circumferential surface 76. This renders the solenoid 2 more resistant to corrosion.

Third Embodiment

Figure 6:
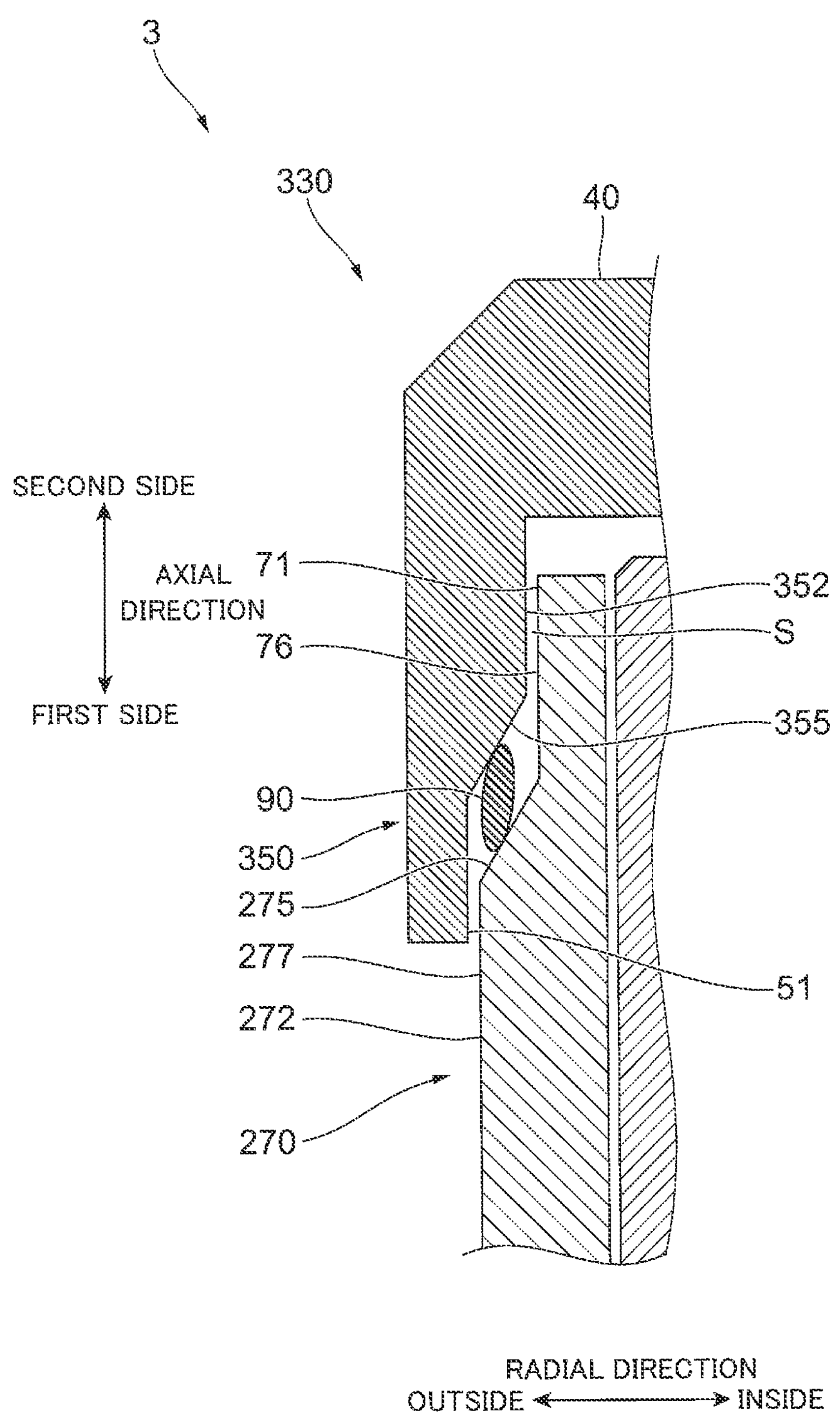
FIG. 6 illustrates an example schematic configuration of a solenoid according to a third embodiment.

FIG. 6 illustrates an example schematic configuration of a solenoid 3 according to a third embodiment.

Distinctions of the solenoid 3 according to the third embodiment from the solenoid 2 according to the second embodiment relate to a cover unit 330 and an outer protruding portion 350, which correspond to the cover unit 30 and the outer protruding portion 50, respectively. The distinctions from the second embodiment are described below. The same reference numerals are used to identify the same elements in the second and third embodiments, and detailed descriptions thereof are omitted.

A distinction of the outer protruding portion 350 from the outer protruding portion 50 according to the second embodiment relates to a second cylindrical portion 352, which corresponds to the second cylindrical portion 52. The second cylindrical portion 352 includes, at the first side end, an inclined surface 355 that is inclined relative to the axial direction such that the diameter gradually increases from the second side toward the first side. The inclined surface 355 is inclined relative to the axial direction in a different direction than the inclined surface 55 according to the second embodiment. Hence, the inclined surface 355 and the inclined surface 275 are inclined in the same direction relative to the axial direction.

In the above configured solenoid 3, the sealing element 90 contacts the inclined surface 355 of the cover unit 330 and the inclined surface 275 of the outer housing 270, which leads to a larger contact area between the inclined surfaces 355, 275 and the sealing element 90. This provides improved sealing performance of the gap S between the cover unit 330 and the outer housing 270, which in turn provides improved reliability of the sealing structure within the outer housing 270.

The solenoid 3 can do without components necessary for securing the cover unit 330, which can lead to reduced components and thus reduced costs. In addition, the operator can easily assemble the solenoid 3.

Fourth Embodiment

Figure 7:
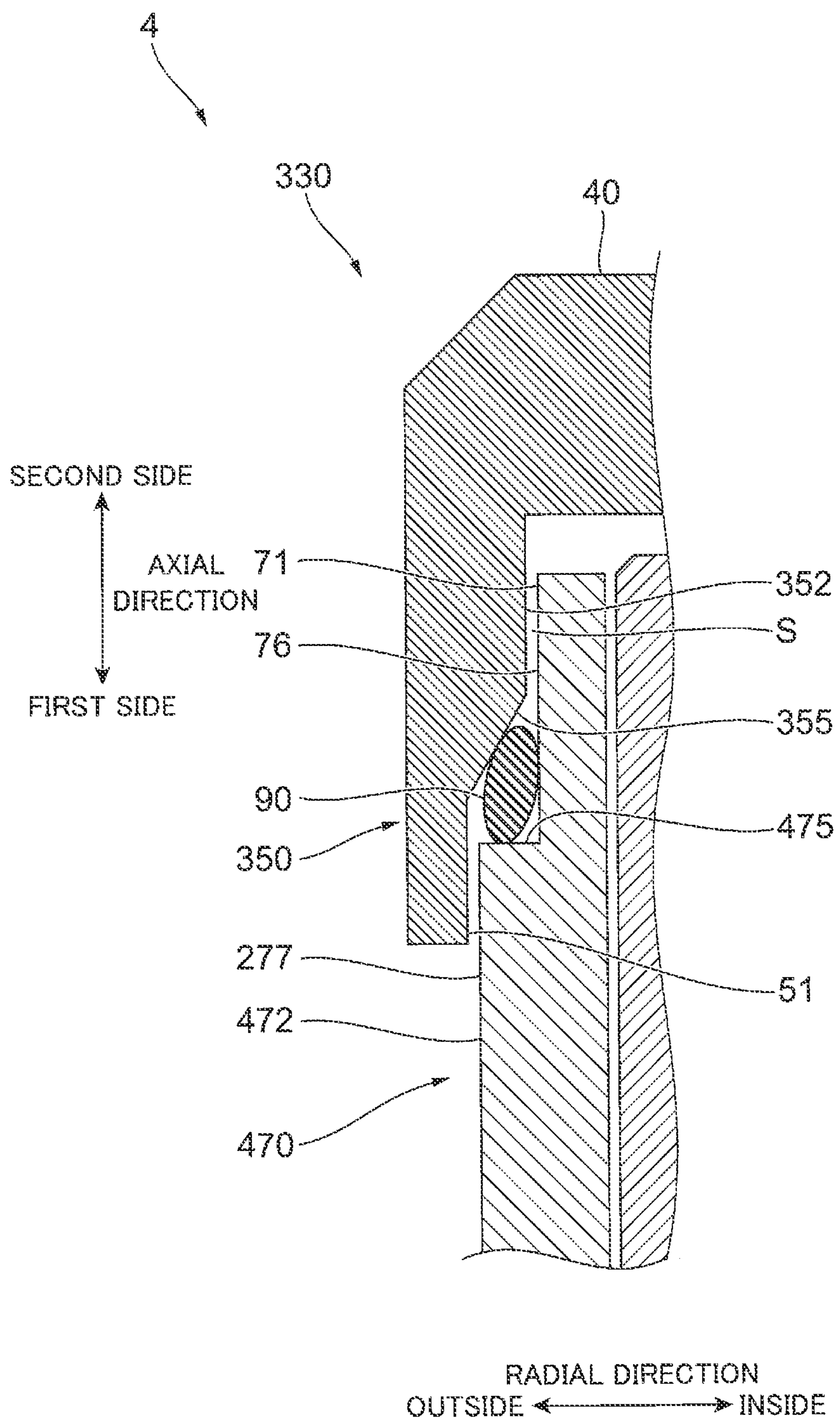
FIG. 7 illustrates an example schematic configuration of a solenoid according to a fourth embodiment.

FIG. 7 illustrates an example schematic configuration of a solenoid 4 according to a fourth embodiment.

A distinction of the solenoid 4 according to the fourth embodiment from the solenoid 3 according to the third embodiment relates to an outer housing 470, which corresponds to the outer housing 270. The distinction from the third embodiment is described below. The same reference numerals are used to identify the same elements in the third and fourth embodiments, and detailed descriptions thereof are omitted.

A distinction of the outer housing 470 from the outer housing 270 according to the third embodiment relates to a second cylindrical portion 472, which corresponds to the second cylindrical portion 272. The second cylindrical portion 472 includes, at the second side end, a perpendicular surface 475 perpendicular to the axial direction, instead of the inclined surface 275 inclined relative to the axial direction.

In the above configured solenoid 4, the sealing element 90 contacts the inclined surface 355 of the cover unit 330 and the perpendicular surface 475 of the outer housing 470, which leads to a larger contact area between the inclined surface 355 and the sealing element 90 as compared to when both ends of the sealing element 90 contact surfaces that are perpendicular to the axial direction. This provides improved sealing performance of the gap S between the cover unit 330 and the outer housing 470, which in turn provides improved reliability of the sealing structure within the outer housing 470.

The solenoid 4 can do without components necessary for securing the cover unit 330, which can lead to reduced components and thus reduced costs. In addition, the operator can easily assemble the solenoid 4.

Fifth Embodiment

Figure 8:
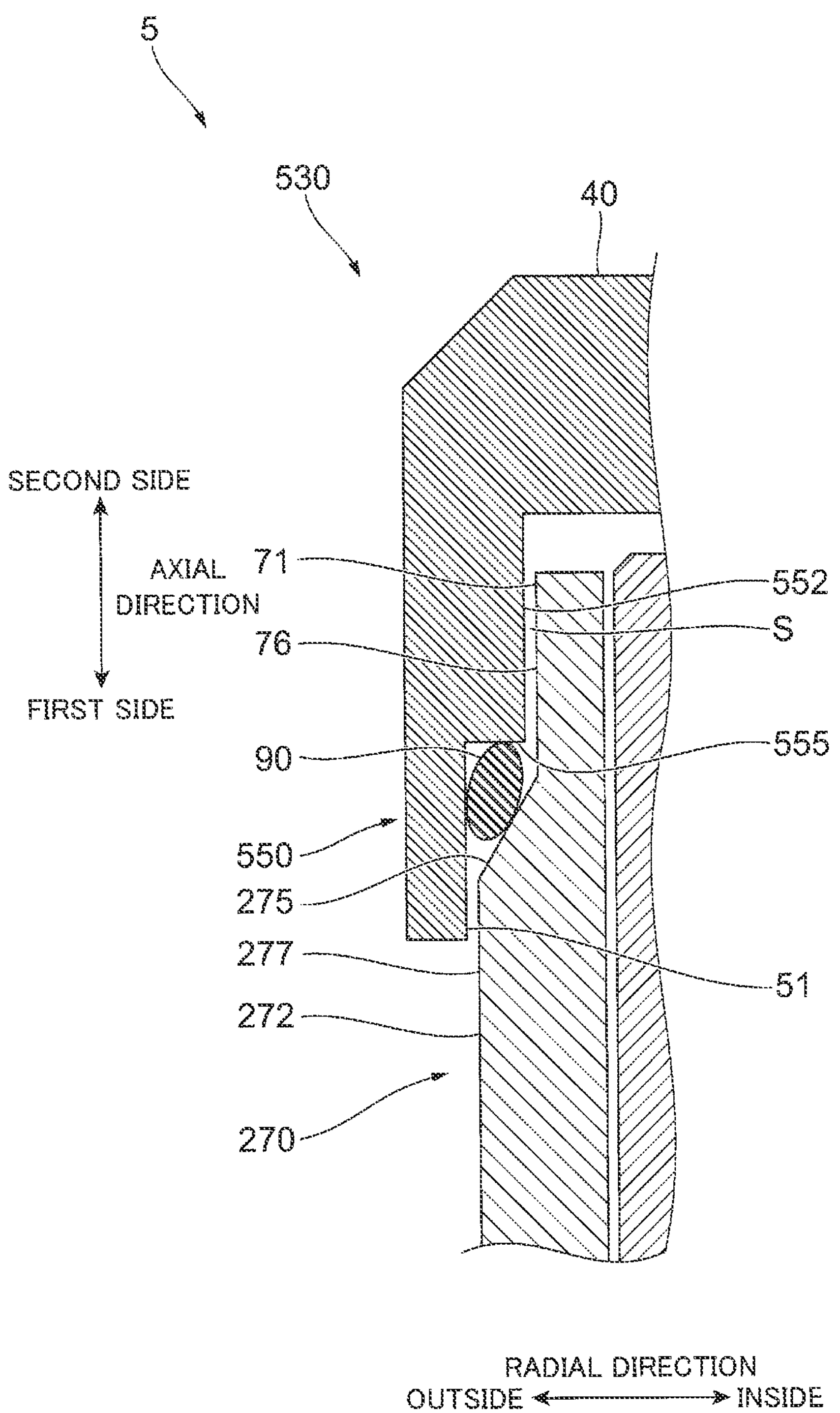
FIG. 8 illustrates an example schematic configuration of a solenoid according to a fifth embodiment.

FIG. 8 illustrates an example schematic configuration of a solenoid 5 according to a fifth embodiment.

Distinctions of the solenoid 5 according to the fifth embodiment from the solenoid 3 according to the third embodiment relate to a cover unit 530 and an outer protruding portion 550, which correspond to the cover unit 330 and the outer protruding portion 350, respectively. The distinctions from the third embodiment are described below. The same reference numerals are used to identify the same elements in the third and fifth embodiments, and detailed descriptions thereof are omitted.

A distinction of the outer protruding portion 550 from the outer protruding portion 350 according to the third embodiment relates to a second cylindrical portion 552, which corresponds to the second cylindrical portion 252. The second cylindrical portion 552 includes, at the first side end, a perpendicular surface 555 perpendicular to the axial direction, instead of the inclined surface 355 inclined relative to the axial direction.

In the above configured solenoid 5, the sealing element 90 contacts the perpendicular surface 555 of the cover unit 530 and the inclined surface 275 of the outer housing 270, which leads to a larger contact area between the inclined surface 275 and the sealing element 90 as compared to when both ends of the sealing element 90 contact surfaces that are perpendicular to the axial direction. This provides improved sealing performance of the gap S between the cover unit 530 and the outer housing 270, which in turn provides improved reliability of the sealing structure within the outer housing 270.

The solenoid 5 can do without components necessary for securing the cover unit 530, which can lead to reduced components and thus reduced costs. In addition, the operator can easily assemble the solenoid 5.

Sixth Embodiment

Figure 9:
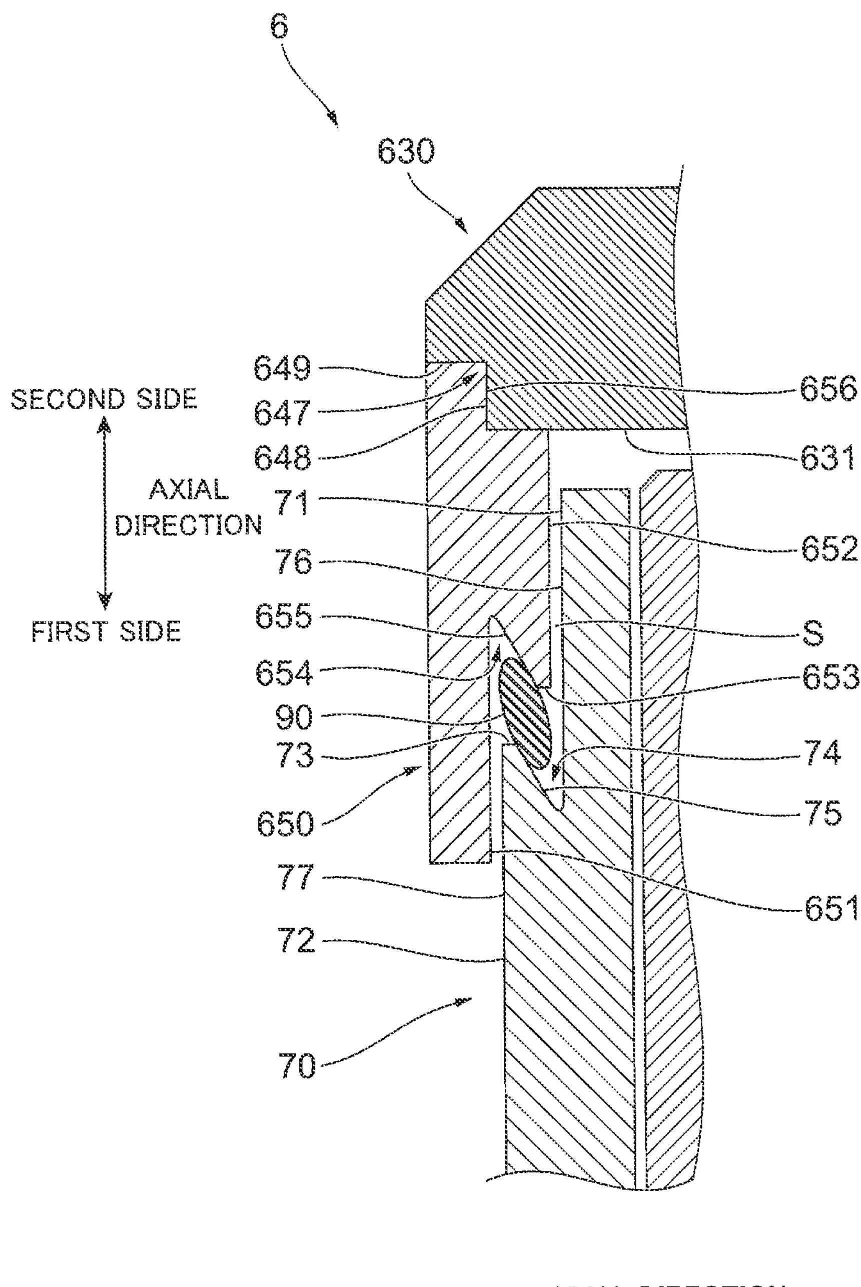
FIG. 9 illustrates an example schematic configuration of a solenoid according to a sixth embodiment.

FIG. 9 illustrates an example schematic configuration of a solenoid 6 according to a sixth embodiment.

Distinctions of the solenoid 6 according to the sixth embodiment from the solenoid 1 according to the first embodiment relate to a cover unit 630, which corresponds to the cover unit 30, and a sleeve 650 (described below) fitted onto the cover unit 630. The distinctions from the first embodiment are described below. The same reference numerals are used to identify the same elements in the first and sixth embodiments, and detailed descriptions thereof are omitted.

In a distinction from the cover unit 30, the cover unit 630 does not include the outer protruding portion 50. The cover unit 630 is formed with a recess 647 depressed from an end face 631 covering the opening 61 of the housing 60. The recess 647 is defined by a parallel surface 648 parallel to the axial direction and a perpendicular surface 649 perpendicular to the axial direction and formed at the second side end.

The solenoid 6 includes the sleeve 650, which corresponds to the outer protruding portion 50, as a separate component from the cover unit 630. The sleeve 650 is a molded resin product molded using a mold separately from the cover unit 630.

The sleeve 650 includes a first cylindrical portion 651 and a second cylindrical portion 652, which correspond to the first cylindrical portion 51 and the second cylindrical portion 52 of the outer protruding portion 50, respectively. The sleeve 650 also includes an end face 653, a groove 654, and an inclined surface 655, which correspond to the end face 53, the groove 54, and the inclined surface 55 of the outer protruding portion 50, respectively.

The sleeve 650 further includes a protrusion 656 protruding toward the second side from the outer periphery of the second side end face of the second cylindrical portion 652. The protrusion 656 is a cylindrically protruding portion, and the diameter of its inner circumferential surface is smaller than the diameter of the parallel surface 648 of the cover unit 630. The sleeve 650 is press-fitted onto the cover unit 630 as the protrusion 656 is fitted onto the recess 647 of the cover unit 630 by interference fit. Alternatively, the protrusion 656 of the sleeve 650 is fitted onto the recess 647 of the cover unit 630 by clearance fit.

In the above configured solenoid 6, the sealing element 90 contacts the inclined surface 655 of the cover unit 630 and the inclined surface 75 of the outer housing 70, which leads to a larger contact area between the inclined surfaces 655, 75 and the sealing element 90. This provides improved sealing performance of the gap S between the cover unit 630 and the outer housing 70, which in turn provides improved reliability of the sealing structure within the outer housing 70.

The solenoid 6 can also do without components necessary for securing the cover unit 630, which can lead to reduced components and thus reduced costs. In addition, the operator can easily assemble the solenoid 6. Furthermore, since the sealing element 90 is a general-purpose component, it can be shared with components used for sealing other products. Also, the sealing element 90 is disposed between the groove 654 of the sleeve 650 and the groove 74 of the outer housing 70, which prevents the sealing element 90 from falling such that the major axis of the ellipse lies parallel to the radial direction.

It should be noted that the cover unit 630 and the sleeve 650 need not be separate components; the cover unit 630 and the sleeve 650 may be molded from resin in a primary mold and in a secondary mold, respectively, and joined together.

The cover unit 30 according to the second embodiment, the cover unit 330 according to the third and fourth embodiments, and the cover unit 530 according to the fifth embodiment may also be composed of two separate components that are mated or of two components that are joined together, like the cover unit 630 and the sleeve 650 according to the sixth embodiment.

Seventh Embodiment

Figure 10:
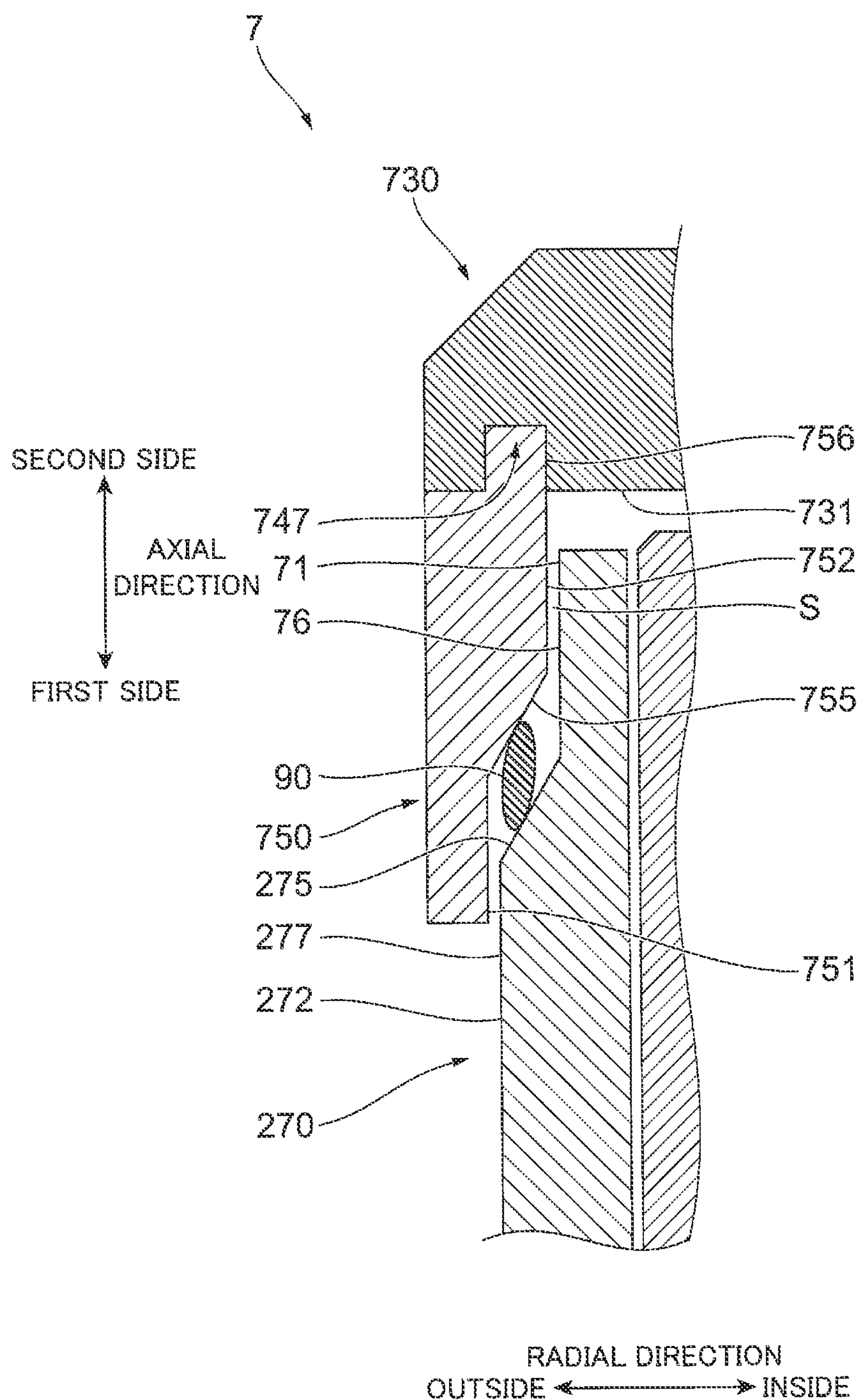
FIG. 10 illustrates an example schematic configuration of a solenoid according to a seventh embodiment.

FIG. 10 illustrates an example schematic configuration of a solenoid 7 according to a seventh embodiment.

Distinctions of the solenoid 7 according to the seventh embodiment from the solenoid 3 according to the third embodiment relate to a cover unit 730, which corresponds to the cover unit 330, and a sleeve 750 (described below) fitted onto the cover unit 730. The distinctions from the third embodiment are described below. The same reference numerals are used to identify the same elements in the third and seventh embodiments, and detailed descriptions thereof are omitted.

In a distinction from the cover unit 330, the cover unit 730 does not include the outer protruding portion 350. The cover unit 730 is formed with a recess 747 cylindrically depressed from an end face 731 covering the opening of the outer housing 70.

The solenoid 7 includes the sleeve 750, which corresponds to the outer protruding portion 350, as a separate component from the cover unit 730. The sleeve 750 is a molded resin product molded using a mold separately from the cover unit 730.

The sleeve 750 includes a first cylindrical portion 751, a second cylindrical portion 752, and an inclined surface 755, which correspond to the first cylindrical portion 51, the second cylindrical portion 352, and the inclined surface 355 of the outer protruding portion 350, respectively. The sleeve 750 further includes a protrusion 756 protruding toward the second side from the inner periphery of the second side end face of the second cylindrical portion 752. The protrusion 756 is a cylindrically protruding portion. The sleeve 750 is press-fitted onto the cover unit 730 as the protrusion 756 is fitted into the recess 747 of the cover unit 730 by interference fit. Alternatively, the protrusion 756 of the sleeve 750 is fitted into the recess 747 of the cover unit 730 by clearance fit.

In the above configured solenoid 7, the sealing element 90 contacts the inclined surface 755 of the sleeve 750 and the inclined surface 275 of the outer housing 270, which leads to a larger contact area between the inclined surfaces 755, 275 and the sealing element 90. This provides improved sealing performance of the gap S between the cover unit 730 and the outer housing 270, which in turn provides improved reliability of the sealing structure within the outer housing 270.

The solenoid 7 can also do without components necessary for securing the cover unit 730, which can lead to reduced components and thus reduced costs. In addition, the operator can easily assemble the solenoid 7. Furthermore, since the sealing element 90 is a general-purpose component, it can be shared with components used for sealing other products.

It should be noted that the cover unit 730 and the sleeve 750 need not be separate components; the cover unit 730 and the sleeve 750 may be molded from resin in a primary mold and in a secondary mold, respectively, and joined together.

The cover unit 30 according to the second embodiment, the cover unit 330 according to the third and fourth embodiments, and the cover unit 530 according to the fifth embodiment may also be configured for mating or joining using a cylindrical recess and a cylindrical protrusion, like the cylindrical recess 747 of the cover unit 730 and the cylindrical protrusion 756 of the sleeve 750 according to the seventh embodiment.

REFERENCE SIGNS LIST

1, 2, 3, 4, 5, 6, 7 Solenoid
20 Solenoid unit (an example of the solenoid body)
30, 330, 530, 630, 730 Cover unit
31 Coil
41 Inner protruding portion (an example of the peripheral portion)
50, 350, 550 Outer protruding portion
55, 355 Inclined surface (an example of the first intersecting surface)
60 Housing
70, 270, 470 Outer housing
75, 275 Inclined surface (an example of the second intersecting surface)
80 Inner housing
90 Sealing element
100 Suspension device
160 Damping force mechanism unit
170 Adjustment valve
180 Solenoid valve
475 Perpendicular surface (an example of the second intersecting surface)
555 Perpendicular surface (an example of the first intersecting surface)
650, 750 Sleeve

The invention claimed is:

1. A solenoid comprising:
a solenoid body including a coil and a peripheral portion that is made of molded resin and covers a periphery of the coil;
a housing into which the peripheral portion is inserted; and
a sealing element configured to seal a gap between the solenoid body and the housing, wherein
the peripheral portion covers an opening of the housing and includes a first intersecting surface extending in a direction that intersects a direction of insertion of the peripheral portion into the housing,
the housing includes a second intersecting surface extending in a direction that intersects the direction of insertion, and
the sealing element is configured to seal the gap by contacting both of the first intersecting surface and the second intersecting surface and apply force to the solenoid body and the housing in a direction away from each other, and one of the first intersecting surface and the second intersecting surface is inclined relative to the direction of insertion.

2. The solenoid according to claim 1, wherein the first intersecting surface and the second intersecting surface are inclined in the same direction relative to the direction of insertion.

3. The solenoid according to claim 1, wherein the first intersecting surface and the second intersecting surface are inclined in different directions relative to the direction of insertion.

4. The solenoid according to claim 1, wherein one of the first intersecting surface and the second intersecting surface is perpendicular to the direction of insertion, and the other of the first intersecting surface and the second intersecting surface is inclined relative to the direction of insertion.

5. The solenoid according to claim 1, wherein a cross-section of the sealing element taken in a plane parallel to the direction of insertion is of an elliptical shape with a major axis oriented in the direction of insertion.

6. The solenoid according to claim 1, wherein
the housing is cylindrical, and
the second intersecting surface is formed on an outer periphery of the housing.

7. A solenoid comprising:
a coil;
a peripheral portion that is made of molded resin and covers a periphery of the coil;
a cylindrical sleeve;
a housing into which the peripheral portion is inserted, the housing having an outer circumferential surface thereof covered by the sleeve; and
a sealing element configured to seal a gap between the sleeve and the housing, wherein
the coil, the peripheral portion, and the sleeve constitute a solenoid body,
the peripheral portion entirely covers an opening of the housing,
the sleeve includes a first intersecting surface extending in a direction that intersects a direction of insertion of the peripheral portion into the housing,
the housing includes a second intersecting surface extending in a direction that intersects the direction of insertion, and
the sealing element is configured to seal the gap by contacting both of the first intersecting surface and the second intersecting surface and apply force to the solenoid body and the housing in a direction away from each other, and one of the first intersecting surface and the second intersecting surface is inclined relative to the direction of insertion.

8. The solenoid according to claim 7, further comprising a cover unit covering an opening of the housing, the cover unit including a recess at a position facing the sleeve, wherein
the sleeve is fitted onto the recess.

9. A solenoid valve comprising:
a solenoid; and
a valve configured to have a position thereof adjusted by the solenoid to adjust a force with which a working fluid opens and closes a channel, wherein
the solenoid includes:
a solenoid body including a coil and a peripheral portion that is made of molded resin and covers a periphery of the coil;
a housing into which the peripheral portion is inserted; and
a sealing element configured to seal a gap between the solenoid body and the housing, wherein
the peripheral portion covers an opening of the housing and includes a first intersecting surface extending in a direction that intersects a direction of insertion of the peripheral portion into the housing, the housing includes a second intersecting surface extending in a direction that intersects the direction of insertion, and the sealing element is configured to seal the gap by contacting both of the first intersecting surface and the second intersecting surface and apply force to the solenoid body and the housing in a direction away from each other, and one of the first intersecting surface and the second intersecting surface is inclined relative to the direction of insertion.

10. A suspension device configured to have a damping force thereof adjusted by a solenoid valve, the suspension device comprising:

a cylinder unit including a cylinder containing oil, an outer cylindrical body provided outside the cylinder, and a damper case provided outside the outer cylindrical body, wherein the solenoid valve includes a solenoid and a valve configured to have a position thereof adjusted by the solenoid to adjust a force with which a working fluid opens and closes a channel, and the solenoid includes:

a solenoid body including a coil and a covering portion that is made of molded resin and contains a peripheral portion covering a periphery of the coil and an outer protruding portion protruding toward a first side in a centerline direction;

a housing including an outer housing and an inner housing, the outer housing having a portion thereof on the first side secured to an outer circumferential surface of the damper case and having a periphery of a second side end thereof covered by the outer protruding portion, the inner housing having the peripheral portion inserted therein; and a sealing element configured to seal a gap between the outer protruding portion and the housing, wherein the covering portion covers an opening of the housing and includes a first intersecting surface extending in a direction that intersects a direction of insertion of the peripheral portion into the housing, the housing includes a second intersecting surface extending in a direction that intersects the direction of insertion, and the sealing element is configured to seal the gap by contacting both of the first intersecting surface and the second intersecting surface and apply force to the solenoid body and the housing in a direction away from each other, and one of the first intersecting surface and the second intersecting surface is inclined relative to the direction of insertion.

11. The solenoid according to claim 1, wherein the peripheral portion entirely covers the opening of the housing in a direction perpendicular to an axial direction of the solenoid.

12. The solenoid according to claim 1, wherein the coil is embedded in the peripheral portion.

* * * * *